Feb. 10, 1970           W. E. WAYLAND           3,494,244

FASTENER

Filed Oct. 24, 1967

INVENTOR.
William E. Wayland
BY
Dale A. Winnie
ATTORNEY

United States Patent Office 3,494,244
Patented Feb. 10, 1970

3,494,244
FASTENER
William E. Wayland, Bloomfield Hills, Mich., assignor to Wasco, Inc., Birmingham, Mich., a corporation of Michigan
Filed Oct. 24, 1967, Ser. No. 677,551
Int. Cl. F16b 19/00; A44b 17/00
U.S. Cl. 85—5                                              1 Claim

ABSTRACT OF THE DISCLOSURE

A nail type fastener including a shank portion having an enlarged button-like head and a plurality of closely spaced thin walled frusto-conical flanges provided thereon and spaced apart from the head end.

BACKGROUND OF THE INVENTION

There is a general need, particularly in the automotive field, for a simple and inexpensive fastener for securing rubber, plastic and like members to a supporting structure.

Sheet metal screws, although commonly used, have to be turned down, which takes time, and may cause damage by thread engagement or otherwise in seating them securely.

Snap-in, nail-like and other impact type blind fasteners are easier and faster to apply but are less dependable, at least as presently known, in that they are required to be formed for close fitted extension through a hole and engagement behind the back wall of the receptive member for retention. This is not always easy to accomplish or determine and quite often the fastener will stay engaged in the close fitting hole in the supporting member, and appear to be properly engaged, but will pop out later under a dislodging or jarring influence.

The problem is most prevalent where there are wide variations in the dimensional thickness of parts being engaged together, or there is some resilience in one part, or for other reasons the two parts that are to be engaged together, or the angle at which the fastener is applied, does not allow the fastener to be properly engaged.

SUMMARY OF THE INVENTION

The present invention relates to fasteners in general, and more particularly to the snap-in or nail type of impact fastener.

The fastener of this invention is made of high impact plastic material and looks like a short nail with a large oversized head. It has a series of closely spaced, thin walled frusto-conical flanges about its shank, which are spaced from both its head and leading ends, and which yield successively as the fastener passes through a hole in a member with which it is to be engaged. The recovery of one or more of the flanges behind the back wall of the receptive member assures centered and fast engagement and the number of flanges allows for variances in the depth to which it must be extended to serve its intended purpose.

The leading end of the fastener is tapered to a rounded point and is slightly oversized with respect to the rest of the shank to provide greater holding strength in the first fin or flange and further assure fast retention with even just one thereof engaged behind the back wall of the receptive member.

The number of fins or flanges and their spacing from the head of the fastener may vary with variations in the dimensional tolerance of the parts being secured together.

DETAILED DESCRIPTION

The fastener 10 is made of high impact nylon or like plastic material and looks like a roofing nail with a large flat button-like head 12 extending over a shank 14 which has a group of closely spaced annular flanges 16 provided therearound.

Figure 1:
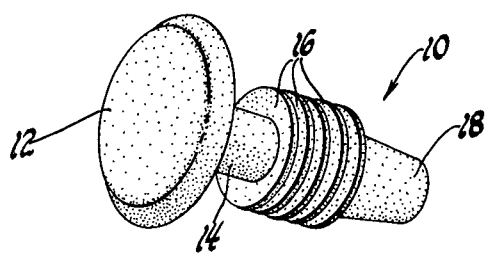
FIGURE 1 is a perspective view of the fastener of this invention.
Figure 3:
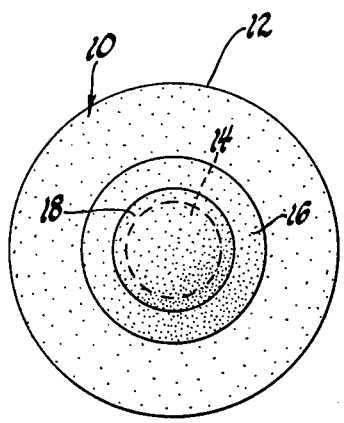
FIGURE 3 is an end view of the fastener, as seen in the plane of line 3—3 of the second figure, looking in the direction of the arrows.
Figure 2:
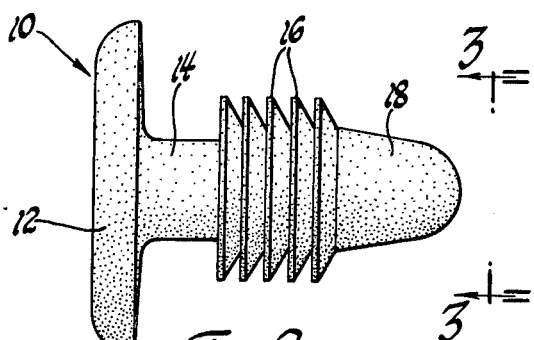
FIGURE 2 is a side elevational view of the fastener.

The annular flanges 16 are actually frusto-conical in shape, as best shown by FIGURE 2, and are inclined rearwardly towards the fastener head 12. They are grouped together and provided about mid-way between the ends of the shank 14 and are in such closely spaced relation as to be indiscernible as to their conical shape except on quite close examination.

The fastener shank 14 is of substantially the same dimensional size from the head 12 to the furthest flange member but is enlarged slightly therebeyond and then tapered to a round point at the extreme end. The larger end is identified as 18 in the drawings and it will be appreciated that while larger than the other part of the shank it is still considerably undersized with respect to the flanges 16.

As designed and made for a specific fastener application, the fastener 10 has the flanges 16 spaced from the fastener head 12 a dimensional distance within the tolerances allowed for the thickness or gauge of the other part, which is generally the supporting member of the two.

Figure 4:
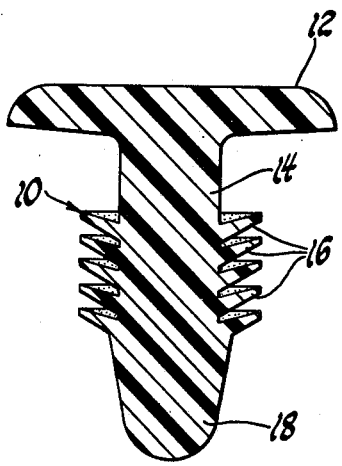
FIGURE 4 is a cross-sectional view of the fastener.

As shown by FIGURE 4, in five to six times normal size, the frusto-conical flanges 16 are so closely spaced as to actually begin within the concavity of the next adjacent flange member. It will also be appreciated that they are of such thin-walled construction as to be relatively flexible and capable of yielding inwardly towards the shank 14 when the fastener is pressed into an undersized hole, with respect to the dimensional size of the flanges, and to lay in overlapping relation to each other in such instances.

The resilience of the high impact plastic material used is of particular importance as regards the flanges 16 since they must yield, as mentioned, and must also be capable of regaining thin outwardly flared shape after passing through a restricting hole, as will hereinafter be described.

Figure 5:
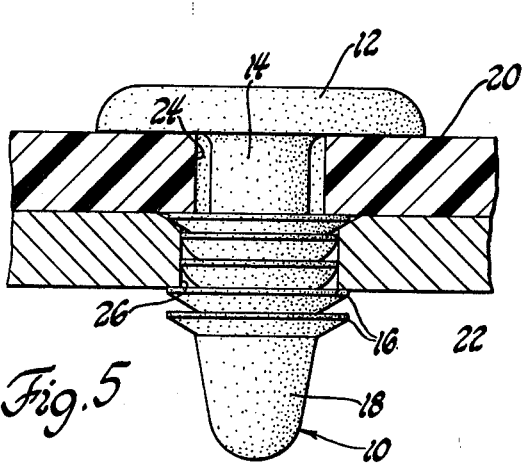
FIGURE 5 is a side view of the fastener shown holding two members engaged together and with the latter shown in cross section to better illustrate the fastener in actual use.

In FIGURE 5, the fastener 10 is shown as used to hold a rubber or plastic member having a wall part 20 to a supporting member 22. The hole 24 through the first part is smaller than the hole 26 through the supporting member, since the former will yield for the fastener, and it will be seen that the spacing of the flanges 16 from the fastener head 12 is equal to the thickness of the wall part 20. Also the flanges 16, which are five in number, have a greater breadth on the shank 14 than the thickness of the other member 22. As a consequence, in the fastener assembly shown the first few flanges 16 are compressed together, in overlapping relation, with their outer edges turned up and are resistant to any effort to remove the fastener, while the lower disposed flanges have regained their original shape behind the back wall of the member 22 and serve as a blind fastener means therefor.

In the assembly shown, as long as one or more of the flanges 16 is in the hole 26 the fastener is retained, since the flanges cannot be upset, and as soon as one of the lower disposed flanges passes through the hole and recovers its former shape the assembly is complete.

In actual practice, the two parts to be assembled are brought together so that the holes 24 and 26 are relatively aligned, the fastener has its end 18 inserted in the first hole and it is then driven home by manual or power operated means. The fastener centers itself, by the taper on its end, and will relatively align the holes as it is forced through until the head of the fastener bottoms out and at which time one or more of the flanges 16 will snap back to its conical shape behind the back wall of the supporting member to complete the fastening operation.

Although it is preferable to have at least two of the flanges 16 open behind the back wall of the supporting member, it will be appreciated that each flange has relatively the same holding strength. Moreover, the first flange, closest the enlarged end 18, is somewhat strengthened by the larger shank end and is, even by itself, virtually impossible to upset.

What is claimed is:

1. A one-piece fastener for use in retaining two parts in assembled relation, by being inserted through relatively aligned holes therein, and comprising;
   a member of high impact plastic material including a cylindrical shank which is solid throughout its length having a relatively flat circular shaped head of a diameter greater than that of said shank provided at one end thereof,
   a plurality of closely spaced relatively thin-walled frusto-conical, annular flanges readily flexible in the direction of said head provided on said shank and standing out in spaced relation apart from both said head and the terminal end of said shank,
   said flanges being inclined towards said head and having a concavity at the side thereof facing said head, each of said flanges extending within the concavity of the next adjacent flange thereto, the opposed faces of each of said flanges defining straight lines in cross-section converging in a direction away from said shank and being inclined toward said head to provide a uniform tapering thickness outward from said shank providing increasing resilience towards the peripheral edges thereof, for allowing said flanges to flex towards said head, and providing increasing root strength resistance towards said shank against a flexing of said flanges in the opposite direction, the outer peripheries of said flanges defining generally cylindrical surfaces of limited axial extent with all of said surfaces being in a single imaginary cylinder,
   said flanges extending for a length on said shank sufficient for undersurface engagement of the first of said flanges with the first of said parts to be assembled and for undersurface engagement of at least the last of said flanges with the other of said parts,
   and said shank being rounded at its terminal end to facilitate entry into the aligned holes in said parts to be assembled, and said terminal end merging with the flange nearest thereto for providing added root strength resistance against reverse flexing thereof.

References Cited

UNITED STATES PATENTS

| | | | |
|---|---|---|---|
| 2,896,889 | 7/1959 | Hershberger et al. | 85—5 |
| 3,139,784 | 7/1964 | Moorman | 85—5 |
| 3,218,680 | 11/1965 | Deal et al. | 85—5 |
| 3,272,059 | 9/1966 | Lyday et al. | 85—5 |

RAMON S. BRITTS, Primary Examiner

U.S. Cl. X.R.

24—208